United States Patent
Golborn et al.

[11] 3,890,275
[45] June 17, 1975

[54] IMIDOMETHYL PHOSPHONATES

[75] Inventors: Peter Golborn, Skelmersdale, England; James J. Duffy, Buffalo, N.Y.

[73] Assignee: Hooker Chemicals & Plastics Corporation, Niagara Falls, N.Y.

[22] Filed: Aug. 2, 1974

[21] Appl. No.: 494,109

Related U.S. Application Data

[63] Continuation-in-part of Ser. No. 239,760, March 30, 1972, Pat. No. 3,849,440.

[52] U.S. Cl.................. 260/45.8 NE; 106/15 FP; 117/138.8 B; 117/143 R
[51] Int. Cl..... C08f 45/60; C08g 51/60; C09k 3/28
[58] Field of Search.......... 260/45.8 NE; 106/15 FP; 117/138.8 B, 143 R

[56] References Cited
UNITED STATES PATENTS
2,635,112    4/1953    Fields.................................. 260/970

Primary Examiner—Ronald W. Griffin
Attorney, Agent, or Firm—Peter F. Casella; Donald C. Studley; William J. Crossetta, Jr.

[57] ABSTRACT

New compounds are disclosed of the formula

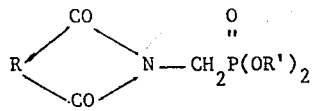

wherein R' is selected from the group consisting of phenyl, lower alkenyl and halogen substituted and unsubstituted lower alkyl of 1 to 6 carbon atoms and R is selected from the group consisting of lower alkenylene and lower alkylene of 1 to 8 carbon atoms. The compounds of this invention are useful in the production of polymers and copolymers which possess flame retardant properties.

16 Claims, No Drawings

IMIDOMETHYL PHOSPHONATES

This is a continuation-in-part of Ser. No. 239,760, filed Mar. 30, 1972, now U.S. Pat. No. 3,849,440, issued Nov. 19, 1974.

FIELD OF INVENTION

This invention relates to novel compounds of the formula

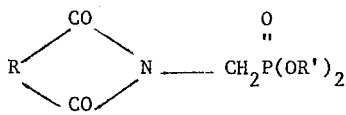

wherein R' is selected from the group consisting of phenyl, lower alkenyl and halogen substituted and unsubstituted lower alkyl of 1 to 6 carbon atoms and R is selected from the group consisting of lower alkenylene and lower alkylene of 1 to 8 carbon atoms.

The invention includes methods of applying the above novel compounds to normally flammable thermoplastic and thermosetting resin compositions so as to render them flame retardant.

BACKGROUND OF THE INVENTION

Many flame retarding agents and methods of application have been developed in attempts to obtain flame resistant thermoplastic and thermosetting resin compositions.

The production of thermoplastic and thermosetting resin compositions which are flame retardant is of considerable commercial importance. For example, such articles as castings, moldings, foamed or laminated structures and the like are required, or are at least desired, to be resistant to fire and flame and to possess the ability to endure heat without deterioration. The use of various materials incorporated into thermoplastic resins so as to improve the flame retardancy thereof has been known. Many compounds have been commercially available for such use, among them being chlorostyrene copolymers, chlorinated paraffin wax in admixture with triphenyl styrene, chlorinated paraffins and aliphatic antimonical compounds, as well as antimony oxide-chlorinated hydrocarbon mixtures. A problem associated with these compounds have been however, the fact that generally a large amount, i.e. upwards of 35% of additive, must be incorporated into the resin in order to make it sufficiently flame retardant. Such large amounts of additive may deleteriously affect the physical characteristics of the thermoplastic resin, as well as substantially complicating and increasing the cost of preparation thereof. A further problem is that these prior art additives tend to crystallize or oil out of the resin after a relatively short time of incorporation. The present invention relates to a group of compounds which may be added to thermoplastic resins in relatively small amounts and still produce satisfactory flame retardant compositions which will not crystallize nor oil out of the resin after incorporation therein.

OBJECTS OF THE INVENTION

It is, therefore, a principal object of this invention to provide novel compounds of the formula:

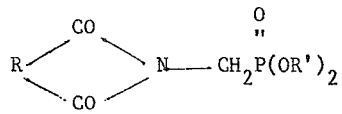

wherein R' is selected from the group consisting of phenyl, lower alkenyl and halogen substituted and unsubstituted lower alkyl of 1 to 6 carbon atoms and R is selected from the group consisting of lower alkenylene and lower alkylene of 1 to 8 carbon atoms. It is also an object of this invention to provide flame retarding thermoplastic and thermosetting resin compositions comprising normally flammable thermoplastic or thermosetting resin materials. A further object is to provide a process for treating normally flammable thermoplastic or thermosetting resin compositions to render them flame retardant. A particular object is to devise a composition comprising normally flammable thermoplastic or thermosetting polymers and an effective flame retarding amount of the compound represented by the formula

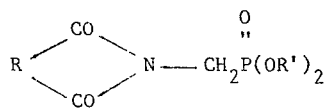

wherein R and R' are as above described.

These and other objects of the present invention will be obvious from the following description.

DESCRIPTION OF THE INVENTION

In accordance with this invention there are provided novel compounds, for imparting flame retardancy to textiles and thermoplastic resin materials, of the formula

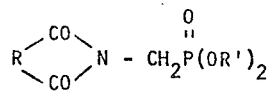

wherein R' is selected from the group consisting of phenyl, lower alkenyl and halogen substituted and unsubstituted lower alkyl of 1 to 6 carbon atoms and R is selected from the group consisting of lower alkenylene and lower alkylene of 1 to 8 carbon atoms. More specifically, the preferred compounds of the present invention include these compounds wherein R and R' are independently selected from lower alkyl of 1 to 6 carbon atoms.

Illustrative examples of compounds of the present invention include, for instance, compounds of the general formula wherein R and R' are selected from branched or straight chain methyl, ethyl, propyl, butyl, pentyl and hexyl radicals, such as

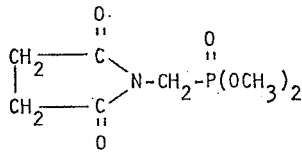

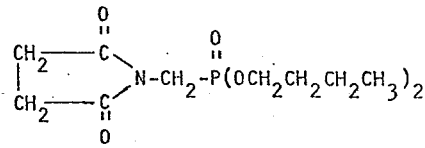

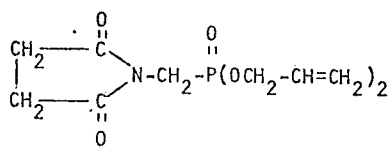
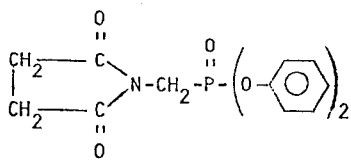
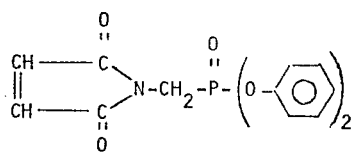

The synthesis of the compositions of the present invention is accomplished by reacting an N-hydroxymethyl imide of the formula

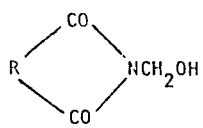

with a trialkyl phosphite of the formula

$(R'O)_3P$ wherein R and R' are as previously described in a suitable solvent. Typically, the reaction occurs at elevated temperatures and is continued for about 1 to about 12 hours. Temperatures are generally from about 50°C to about 160°C. Preferably, reaction is continued from about 3 to about 6 hours at a temperature of about 80°C to about 120°C. The solvent, or other volatiles, are thereafter stripped, or otherwise removed from the product. Suitable solvents include benzene, toluene, xylene, aliphatic or aromatic hydrocarbons or excess of the phosphite. Typical N-hydroxymethyl imides operable as reactants herein include

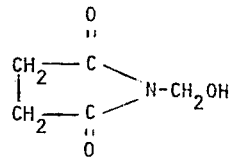
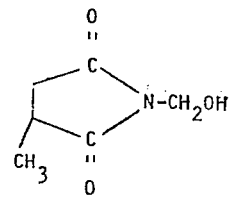
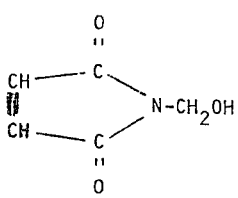
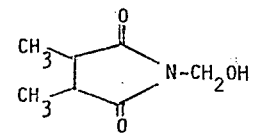
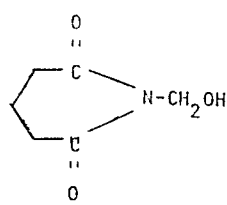
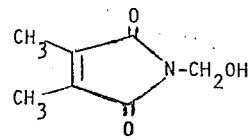
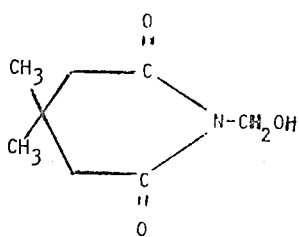
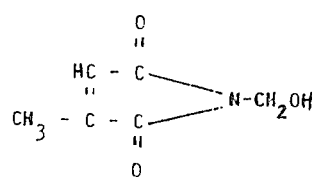

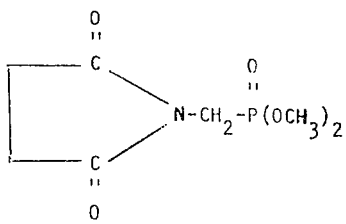

The flame retardant compounds or additives of the invention may be incorporated into thermoplastic or thermosetting resin compositions by any known method. That is to say, the flame retardant additive may be added to the resin by milling the resin and the additive on, for example, a two-roll mill, or in a Banbury mixer etc., or it may be added by molding or extruding the additive and resin simultaneously, or by merely blending it with the resin in powder form and thereafter forming the desired article. Additionally, the flame-retardant may be added during the resin manufacture, i.e., during the polymerization procedure by which the resin is made, provided the catalysts etc. and other ingredients of the polymerization system are inert thereto. Generally, the compounds of this invention may be incorporated into the thermoplastic resin in flame-retarding amounts, i.e. generally amounts ranging from about 5% by weight, to about 50% by weight, preferably from about 20% by weight, to about 40% by weight, based on the weight of the polymer, have been found sufficient.

The thermoplastic resin embraced within the scope of this invention include the homopolymers and copolymers of unsaturated aliphatic, alicyclic, and aromatic hydrocarbons. Suitable monomers are ethylene, propylene, butene, pentene, hexene, heptene, octene, 2-methylpropene-1, 3-methylbutene-1, 4-methylpentene-1, 4-methylhexene-1,5-methylhexene-1, bicyclo-(2.2.1)-2-heptene, butadiene, pentadiene, hexadiene, isoprene, 2,3-dimethylbutadiene-1,3, 2-methylpentadiene-1,3, 4-vinylcyclohexene, vinylcyclohexene, cyclopentadiene, styrene and methylstyrene, and the like.

Other polymers in addition to the above-described olefin polymers that are useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins and paint vehicles, such as bodied linseed oil; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleoresins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymers; polyformaldehyde; polyphenylene oxide; polymers of diallyl phthalates and phthalates; polycarbonates of phosgene or thiophosgene and dihydroxy compounds such as bisphenols, phosgene, thermoplastic polymers of bisphenols and epichlorohydrin (trade named Phenoxy polymers); graft copolymers and polymers of unsaturated hydrocarbons and unsaturated monomer, such as graft copolymers of polybutadiene, styrene and acrylonitrile, commonly called ABS resins; ABS polyvinyl chloride polymers, recently introduced under the trade name of Cycovin; and acrylic polyvinyl chloride polymers, known by the trade name Kydex 100.

The polymers of the invention can be in various physical forms, such as shaped articles, for example, moldings, sheets, rods, and the like; fibers, coatings, films and fabrics, and the like.

The compounds of this invention have been found to have particular utility in ABS resins and in elastomeric materials such as acrylic rubber; acrylonitrile-butadiene styrene terpolymers; butadiene-acrylonitrile copolymers; butyl rubber; chlorinated rubbers, e.g., polyvinyl chloride resins, chloroprene rubber, chlorosulfonated polyethylene; ethylene polymers, e.g., ethylene-propylene copolymers, ethylene-propylene terpolymers; fluorinated rubbers, butadiene rubbers, e.g., styrene-butadiene rubber, isobutylene polymers, polybutadiene polymers, polyisobutylene rubbers, polyisoprene rubbers; polysulfide rubbers; silicon rubbers; urethane rubbers; high styrene resins latices, high styrene resins, vinyl resins; sponge rubber; and the like.

It should be noted that it is also within the scope of the present invention to incorporate such ingredients as plasticizers, dyes, pigments, stabilizers, antioxidants, antistatic agents and the like to the novel composition.

ASTM Test D2863-70, used in accordance with the following examples, generally provides for the comparison of relative flammability of self-supporting plastics by measuring the minimum concentration of oxygen in a slowly rising mixture of oxygen and nitrogen that will support combustion. The procedure encompasses supporting cylindrical test specimens 70–150 mm long × 8.0 mm in diameter vertically in a glass tube fitted with controlled upward oxygen/nitrogen gas flow. The top of the specimen is ignited and oxygen flow is adjusted until it reaches that minimum rate at which the specimen is extinguished before burning 3 minutes or 50 mm whichever happens first. The oxygen index($n$) is then calculated as follows:

$$n,\% = (100 \times O_2)/(O_2+N_2)$$

wherein $O_2$ is the volumetric flow of oxygen, at the minimal rate and $N_2$ is the corresponding volumetric flow rate of nitrogen.

A modification of ASTM Test D635-68 used in accordance with the following examples, generally provides for the comparison of burning rates, self-extinguishment and non-burning characteristics of plastics in the form of sheets, bars, plates or panels. The procedure encompasses preparing cylindrical specimens about 150 mm long × 8.0 mm in diameter with and without the subject flame retardant additive. Each sample is marked at points 1 inch and 4 inches from its end and held, marked end in the flame, at a 45° angle in a controlled burner flame (1 inch flame length) for two 30 second attempts. The movement of the flame up the length of the sample through the two points is measured for rate of burning, non-burning or self-extinguishing characteristics. A sample is rated SE(self-extinguishing) if the flame burns through the first point but extinguishes before reaching the second point. A sample is rated NB(non-burning) if, upon ignition it does not burn to the first point.

The following examples are set forth for purposes of illustration only and are not to be construed as limitations of the present invention except as set forth in the appended claims. All parts and percentages are by weight unless otherwise specified.

EXAMPLE I

Preparation of

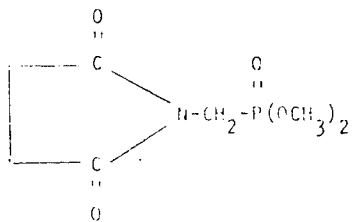

32.3g. (0.25 mole) of N-hydroxymethyl succinimide, 37g. (0.3 mole) of trimethyl phosphite and 80 ml. of diglyme were mixed in a 250 ml. flask. The reaction mixture was slowly heated to 115°C and held at this temperature for 15 hours. After cooling, volatile material was removed from the reaction mixture by stripping under a vacuum of 1 mm. mercury at 85°C. 55.2g. desired product, a viscous oil, was obtained. Elemental analysis, infrared spectroscopy and nuclear magnetic resonance spectroscopy confirmed the structure of the product to be that of the desired compound.

EXAMPLE II

Preparation of

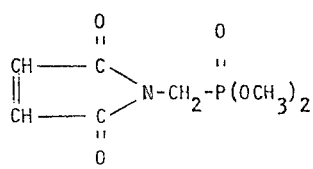

A 100 ml. flask was charged with 50 ml. of trimethyl phosphite and was heated to 65°C. 2 g. of N-hydroxymethyl maleimide was added to the reaction mixture and the amber colored solution was heated at 65° for 20 minutes. The then treated reaction product was then stripped under vacuum to yield 3.1g. of the desired product, which was shown to be substantially pure, by infrared and nuclear magnetic resonance spectroscopy.

EXAMPLE III

Preparation of

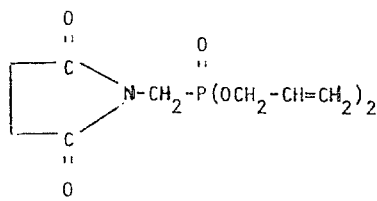

A mixture of 5.8 g. (0.045 mole) of N-hydroxymethyl succinimide and 20.1 g. (0.1 mole) of triallyl phosphite was heated to 130°C, in a 250 ml. round bottomed flask, for five hours. The mixture was thereafter cooled and then slowly heated to 120°C, at 2 mm. pressure, to remove any unreacted phosphite and other volatile material. Upon cooling a clear viscous oil weighing 11.9g (98% yield) was isolated. Infrared and nuclear magnetic resonous spectroscopy showed the material to be the desired product and essentially free from impurities.

EXAMPLE IV

Preparation of

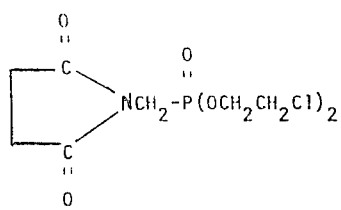

A 250 ml. round bottomed flask was charged with 12.9g of N-hydroxymethyl succinimide (0.1 mole) and 27g. of tris-2-chloroethyl phosphite (0.1 mole). The mixture was slowly warmed to 130°C. and maintained there for four hours. After cooling, the mixture was warmed to 100°C at 0.5 mm. pressure and held for two hours. The product isolated on cooling was a colorless liquid weighing 30.0g. (94.5% yield). Infrared and nuclear magnetic resonance spectroscopy, showed the liquid to be the desired product essentially free from impurities.

EXAMPLE V

Preparation of

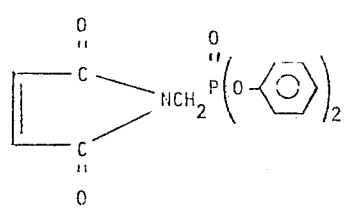

Triphenylphosphite, 62g. (0.2 mole) was heated to 130°C in a round bottomed flask. N-hydroxymethyl maleimide, 25.4g, (0.2 mole) was slowly dropped into the mixture and the reaction held at 130°C for one half hour. Phenol was then removed at 130°C under reduced pressure to give an 82% yield of the desired product. The structure was confirmed by infrared and nuclear magnetic resonance spectroscopy.

EXAMPLE VI

Preparation of

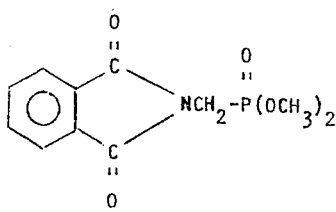

N-hydroxymethyl phthalimide, 78.5g, (0.5 mole) was slowly added in small portions, to trimethyl phosphite, 124.0g (1.0 mole) held at 105° in a round bottomed, three necked flask, fitted with a stirrer, thermometer, and a condenser with a take off. The addition was done over 1.5 hours with volatiles being continuously removed. After the addition was complete the mixture was held at 110°C. for one hour. The reaction mixture was then stripped on a rotary evaporator at 80°C and 5 mm pressure for two hours. The stripped reaction product was identified by elemental analyses and infrared and nuclear magnetic resonance spectroscopy on the desired product and weighed 121g (89.0% yield).

EXAMPLE VII 70 parts of polypropylene and 30 parts of N-dimethylphosphonomethyl succinimide were dry blended for 5 minutes. The resulting dry blended mixture was then brought to a melt and thoroughly mixed in the molten state for about 15 minutes. After mixing the molten product was cooled, cut into small pieces, and slowly added to a 9 mm. diameter glass cylinder immersed in a hot metal salt bath. The temperature of the bath was the melting temperature of the mixture. After all the pieces had been added to the glass cylinder a steel rod, with a weight attached, was pushed into the tube and the material allowed to cool. The cooled rod (approx. 150–200 mm length) is then removed from the glass and tested under ASTM Tests D2863-70 and D635-68 is previously described. The results are as shown in Table I.

EXAMPLES VIII–XIV 30 parts samples of various iminomethyl phosphonates were mixed with 70 parts of various polymers and treated by the process of Example 7. The results and testing under modified ASTM Tests D2863-70 and D635-68 are as shown in Table I.

EXAMPLES XV–XX

Samples of polymers without imidomethyl phosphonates mixed therewith were subjected to the process of Example 7 and in testing under modified ASTM Tests D2863-70 and D635-68 gave results as shown in Table I.

TABLE I

| Example | Imidomethyl Phosphonates | Percent Additive | Polymer | Flammability OI | D-635(MOD) |
|---|---|---|---|---|---|
| VII | $\text{phth}\text{-N-CH}_2\text{-P(OCH}_3)_2$ | 30 | Polystyrene | 21.8 | NB |
| VIII | $\text{phth}\text{-N-CH}_2\text{-P(OCH}_3)_2$ | 30 | ABS | 23.3 | NB |
| IX | $\text{phth}\text{-N-CH}_2\text{-P(OCH}_3)_2$ | 30 | Polypropylene | 22.2 | NB |
| X | $\text{phth}\text{-N-CH}_2\text{-P(Oϕ)}_2$ | 30 | Epoxy | 27.8 | NB |
| XI | $\text{phth}\text{-N-CH}_2\text{-P(OCH}_2\text{CH}_2\text{Cl})_2$ | 30 | ABS | 27.0 | NB |
| XII | $\text{phth}\text{-N-CH}_2\text{-P(OCH}_2\text{-CH=CH}_2)_2$ | 30 | ABS | 24.1 | NB |
| XIII | $\text{phth}\text{-N-CH}_2\text{-P(OCH}_2\text{CH}_2\text{Cl})_2$ | 30 | Nylon | 24.3 | NB |
| XIV | $\text{benzo-phth}\text{-N-CH}_2\text{-P(OCH}_3)_2$ | 30 | Polyethylene terephthalate | 34 | NB |
| XV | | | Polypropylene | 17.4 | B |
| XVI | | | Polystyrene | 18.0 | B |
| XVII | | | ABS | 19.0 | B |
| XVIII | | | Nylon | 22.1 | SE |
| XIX | | | Polyethylene terephthalate | 22.7 | B |
| XX | | | Epoxy | 22.5 | B |

We claim:
1. An article comprising a resin compound and a flame retardant amount of a compound of the formula

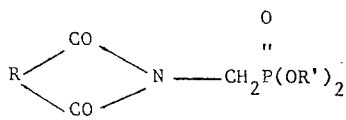

wherein R' is selected from the group consisting of phenyl, lower alkenyl and halogen substituted and unsubstituted lower alkyl of 1 to 6 carbon atoms and R is selected from the group consisting of lower alkenylene and lower alkylene of 1 to 8 carbon atoms, wherein only 2 carbon atoms in said group form annular members of the imide rings.

2. The article of claim 1 wherein said flame retarding amount is from about 5% by weight to about 50% by weight of resin composition.

3. The article of claim 1 wherein said flame retarding amount is from about 20% by weight to about 40% by weight of resin composition.

4. The article of claim 1 wherein said resin is a thermoplastic resin composition.

5. The article of claim 1 wherein said resin is a thermosetting resin composition.

6. The article of claim 1 wherein said compound is of the formula

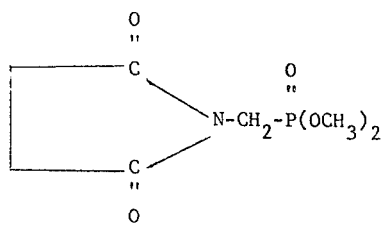

7. The article of claim 1 wherein said compound is of the formula

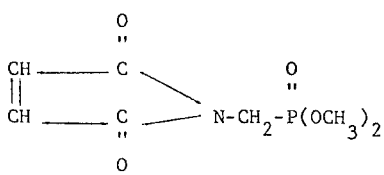

8. The article of claim 1 wherein said compound is of the formula

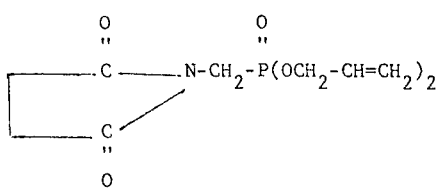

9. The article of claim 1 wherein said compound is of the formula

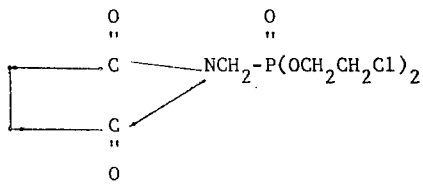

10. The article of claim 1 wherein said compound is of the formula

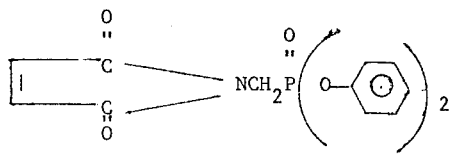

11. A process for rendering resin compositions flame retardant which comprises applying to said resin a flame retardant amount of a compound of the formula

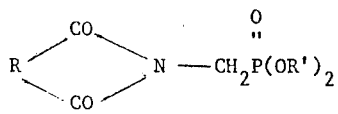

wherein R' is selected from the group consisting of phenyl, lower alkenyl and halogen substituted and unsubstituted lower alkyl of 1 to 6 carbon atoms and R is selected from the group consisting of lower alkenylene and lower alkylene of 1 to 8 carbon atoms, wherein only 2 carbon atoms in said group form annular members of the imide rings.

12. The process of claim 11 wherein said resin composition is a thermosetting resin composition.

13. The process of claim 11 wherein said resin composition is a thermoplastic resin composition.

14. A process for rendering textiles flame retardant which comprises applying to said textile a flame retardant amount of a compound of the formula

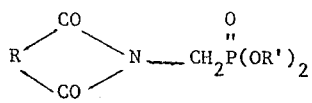

wherein R' is selected from the group consisting of phenyl, lower alkenyl and halogen substituted and unsubstituted lower alkyl of 1 to 6 carbon atoms and R is selected from the group consisting of lower alkenylene and lower alkylene of 1 to 8 carbon atoms, wherein only 2 carbon atoms in said group form annular members of the imide rings.

15. The process of claim 14 wherein said textile is selected from the group consisting of cellulosic fibers, proteinaceous fibers and blends thereof.

16. The product of the process of claim 14 wherein said textile is selected from the group consisting of cellulosic fibers, proteinaceous fibers and blends thereof.

* * * * *